(12) United States Patent
Dempfle et al.

(10) Patent No.: US 10,883,550 B2
(45) Date of Patent: Jan. 5, 2021

(54) SHIFTING DEVICE FOR A MOTOR VEHICLE AND MOTOR VEHICLE TRANSMISSION

(71) Applicant: HOERBIGER ANTRIEBSTECHNIK HOLDING GMBH, Schongau (DE)

(72) Inventors: Andreas Dempfle, Eggenthal (DE); Juergen Binder, Schongau (DE); Peter Echtler, Altenstadt (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 203 days.

(21) Appl. No.: 15/920,858

(22) Filed: May 2, 2018

(65) Prior Publication Data
US 2018/0266493 A1   Sep. 20, 2018

(30) Foreign Application Priority Data

Mar. 15, 2017   (DE) .................. 10 2017 105 527

(51) Int. Cl.
| | | |
|---|---|---|
| *F16D 25/0632* | (2006.01) | |
| *F16D 25/061* | (2006.01) | |
| *F16D 11/14* | (2006.01) | |

(52) U.S. Cl.
CPC .......... *F16D 25/0632* (2013.01); *F16D 11/14* (2013.01); *F16D 25/061* (2013.01)

(58) Field of Classification Search
CPC ... F16D 25/06–0638; F16D 2023/0681; F16D 13/66
See application file for complete search history.

(56) References Cited

U.S. PATENT DOCUMENTS

| | | | | |
|---|---|---|---|---|
| 2,407,060 A | * | 9/1946 | Croft ...................... | F16D 13/28 192/93 C |
| 4,131,185 A | * | 12/1978 | Schall ..................... | F16D 23/04 192/48.614 |
| 4,732,247 A | * | 3/1988 | Frost ....................... | F16D 23/06 192/53.31 |
| 7,108,115 B2 | | 9/2006 | Ebenhoch et al. | |

(Continued)

FOREIGN PATENT DOCUMENTS

| | | |
|---|---|---|
| CN | 105090266 A | 11/2015 |
| DE | 738 514 A | 8/1943 |

(Continued)

*Primary Examiner* — Ernesto A Suarez
*Assistant Examiner* — James J Taylor, II
(74) *Attorney, Agent, or Firm* — McNees Wallace & Nurick LLC

(57) ABSTRACT

A shifting device for a motor vehicle is described, comprising a first coupling component which is adapted to be selectively rotationally coupled to a second coupling component with a form-fit. In an open state, the first coupling component is rotationally decoupled from the second coupling component. In a frictional fit state, the coupling components are rotationally coupled with a frictional fit via a first frictional fit ring and a second frictional fit ring. In a form-fit state, an actuating ring is rotationally coupled to the first coupling component and the second coupling component with a form-fit such that the latter are connected with a form-fit. A motor vehicle transmission, in particular a fully automatic stepped transmission having such a shifting device is additionally presented.

20 Claims, 11 Drawing Sheets

(56) References Cited

U.S. PATENT DOCUMENTS

Figure 1:
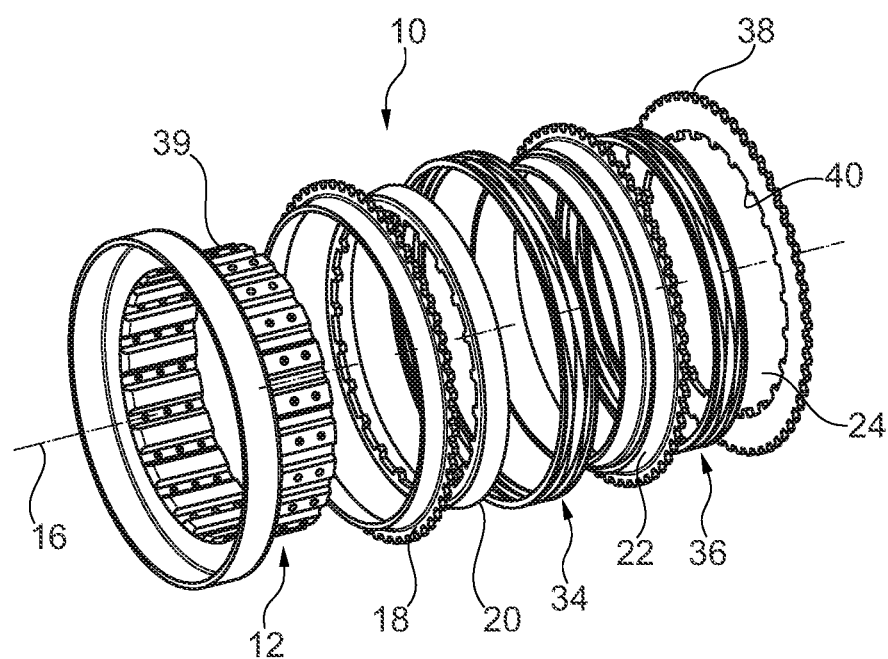

| | | |
|---|---|---|
| 7,281,618 B2 | 10/2007 | Ebenhoch et al. |
| 7,779,979 B2 | 8/2010 | Youk |
| 8,449,423 B2 | 5/2013 | Wilton et al. |
| 9,718,529 B2 * | 8/2017 | Williams ............... B63H 23/30 |
| 9,909,626 B2 * | 3/2018 | Pritchard ............... F16D 13/69 |
| 9,939,027 B2 | 4/2018 | Damm et al. |
| 10,288,129 B2 * | 5/2019 | Long ....................... F16D 13/72 |
| 2007/0295575 A1 | 12/2007 | Turner |
| 2012/0115663 A1 | 5/2012 | Wilton et al. |
| 2012/0247913 A1 * | 10/2012 | Nakano ................... F16D 23/06 |
| | | 192/18 A |

FOREIGN PATENT DOCUMENTS

| | | |
|---|---|---|
| DE | 102 44 523 A1 | 4/2004 |
| DE | 10 2005 007 647 A1 | 8/2006 |
| DE | 10 2006 028 316 A1 | 6/2007 |
| DE | 10 2007 036 097 A1 | 2/2009 |
| DE | 10 2011 103 645 A1 | 1/2012 |
| DE | 102011117804 A1 | 5/2012 |
| DE | 10 2012 014 314 A1 | 1/2014 |
| DE | 10 2014 209 936 B3 | 9/2015 |
| DE | 102014117194 A1 | 5/2016 |
| DE | 10 2014 117 194 B1 | 10/2016 |
| WO | WO-2009015993 A1 * | 2/2009 ............. F16D 47/02 |

* cited by examiner

SHIFTING DEVICE FOR A MOTOR VEHICLE AND MOTOR VEHICLE TRANSMISSION

The invention relates to a shifting device for a motor vehicle, in particular a fully automatic stepped transmission comprising a first coupling component which is adapted to be selectively rotationally coupled to a second coupling component with a form-fit.

The invention further relates to a motor vehicle transmission, in particular to a fully automatic stepped transmission having such a shifting device.

In the vehicle technology, automatic transmissions, in particular stepped fully automatic transmissions having a hydrodynamic torque converter and planetary transmissions are used in addition to manual variable-speed transmissions for the force transmission.

Such fully automatic stepped transmissions act as power shift transmissions free of interruptions of traction, the power flow being realized via planetary gear sets, and the gear shifts being achieved by a coupling and releasing of individual planetary gear set elements. The coupling of individual planetary gear set elements is mostly realized via multidisc clutches which however have a complex and heavy design and require an undesirably large space. Since the multidisc clutches are to be designed for a maximum torque to be transmitted, many friction points or discs are incidentally necessary for torque transmission. Due to the numerous friction points, the undesired drag torques are quite high in the decoupled state and have an adverse effect on the transmission efficiency.

As an alternative to the multidisc clutches, shifting devices are for example known from document DE 10 2014 117 194 B4, by means of which coupling components, which can be planetary gear set elements, can be selectively coupled with a form-fit and/or a frictional fit. A complete decoupling is also possible.

The object of the invention is to further improve shifting devices of the type initially mentioned and motor vehicle transmissions of the type initially mentioned. In particular, a shifting device is to be created which has a compact structure and which is simultaneously adapted to be shifted in a defined and smooth manner. A high shifting comfort thus has to be achieved. A compact shifting device also leads to a compact structure of the motor vehicle transmission.

The object is achieved by a shifting device of the type initially mentioned, comprising a first frictional fit ring which is non-rotatably coupled to the second coupling component so as to be displaceable along a ring central axis, a second frictional fit ring which is non-rotatably coupled to the first coupling component so as to be displaceable along the ring central axis, a third frictional fit ring which is non-rotatably coupled to the second coupling component so as to be displaceable along the ring central axis, and an actuating ring which is non-rotatably coupled to the second coupling component so as to be displaceable along the ring central axis, the first coupling component being rotationally decoupled from the second coupling component in an open state, the first frictional fit ring and the second frictional fit ring being rotationally coupled with a frictional fit in a frictional fit state, and the actuating ring being rotationally coupled to the first coupling component with a form-fit in a form-fit state. The coupling of the frictional fit rings to the first or the second coupling component is achieved by means of a toothing. When the shifting device is transferred from the open state into the frictional fit state, the two coupling components are simultaneously equalized with regard to their rotational speed about the ring central axis. In other words, a speed differential of the two coupling components is eliminated. It is also possible to say that the two coupling components are synchronized. It is then possible to easily and smoothly bring the shifting device into the form-fit state. A transfer of the shifting device from the form-fit state into the open state is also realized via the frictional fit state. A high shifting comfort is therefore achieved. A coupling with a form-fit furthermore has a higher efficiency than a coupling with a frictional fit. This is because losses due to a slip are excluded in the form-fit state. The shifting device thus generally has a high efficiency. Furthermore, high torques can be transmitted by means of connections with a form-fit. It furthermore has a compact structure.

In this context, coupled components are to be understood as components which are operatively connected with each other. The coupling may be realized indirectly via one or more intermediate components or directly, i.e. without any intermediate component.

According to one variant, a centering face is provided on the second frictional fit ring, and a mating centering face is provided on the third frictional fit ring, the centering face and the mating centering face cooperating to center the second frictional fit ring with respect to the ring central axis. The second frictional fit ring is thus centered on the third frictional fit ring. To this end, a centering projection may be provided on the third frictional fit ring, which is for example configured as a circumferential collar which projects in the direction of the ring central axis. The second frictional fit ring may then contact a radial exterior side or a radial interior side of the collar for the centering. The radial exterior side or the radial interior side, respectively, then forms the mating centering face, and the face of the second frictional fit ring in contact therewith forms the centering face. Due to this structure, a compact shifting device is created. Furthermore, the guiding of the second frictional fit ring along the third frictional fit ring ensures a low level of undesired drag torques.

In this connection, the third frictional fit ring need not be directly coupled to the second coupling component and directly centered in the second coupling component. It can also be centered on the second coupling component via an intermediate part, the actuating ring, for example.

Alternatively, or additionally, the actuating ring may have a completely circumferential rim portion which is widened in the direction of the ring central axis with respect to a centric portion, the actuating ring being non-rotatably coupled to the second coupling component so as to be displaceable along the ring central axis via the rim portion. The coupling is preferably realized via a toothing formed on the rim portion which meshes with a corresponding toothing provided on the second coupling component. More preferably, the actuating ring is configured as a sheet-metal moulded part. A thickness of the centric portion oriented along the ring central axis in the mounted state then corresponds a sheet thickness. The circumferential rim portion then is a part of the metal sheet angled with respect to the centric portion. In this configuration, the actuating ring may also be referred to as actuating pot. The surface pressures acting on the second coupling component may be reduced by the widening of the rim portion with a constant torque transmitted between the actuating ring and the second coupling component. This permits the use a less solid, lighter and/or less expensive material for the second coupling component. Alternatively, for the same material, a higher torque may be transmitted. Generally, this therefore leads to a shifting device which is compact in comparison with the torque to be transmitted. The fact that the widening is realized locally in the rim region of the actuating ring also contributes thereto. The widened portion can thus engage around other components of the shifting device in a radial direction with respect to the ring central axis.

According to one embodiment, a friction cone is provided on the first frictional fit ring and is adapted to be rotationally coupled with a frictional fit to a friction cone arranged on the second frictional fit ring, the friction cones being in particular coupled in the frictional fit state and/or in the form-fit state. The connection of the first frictional fit ring to the second frictional fit ring with a frictional fit can be adjusted with regard to the torque to be transmitted via the friction cones. The essential parameters therefore are the friction diameter, the cone angle and the actuating force. For a specified actuating force, the resulting surface pressure can be adjusted via the available friction surface. The shifting device can be simply adapted to different cases of application via these parameters. In any of these cases of application, it is further possible to ensure a smooth synchronizing of the coupling components and thus a smooth achieving and leaving of the frictional fit state. It is thus possible to realize a particularly high shifting comfort. Compared with known multidisc clutches, the required friction surfaces may be arranged on a particularly small space by means of the friction cones.

A further friction cone may be provided on the second frictional fit ring, which is adapted to be rotationally coupled with a frictional fit to a friction cone arranged on the third frictional fit ring, the friction cones being in particular coupled in the frictional fit state and/or in the form-fit state. In this variant, four friction cones are therefore provided, wherein a friction cone is to be interpreted as a flat geometry. The two friction cones provided on the second frictional fit ring can for example be arranged on a front and on a rear side of a circumferential collar. An additional friction surface is provided by an additional friction cone. While maintaining an actuating force, it is thus possible to transmit a higher torque with a frictional fit. The structure of the shifting device remains compact.

The actuating ring may be elastic. A first annular portion of the actuating which extends over a first radius area and the central axis of which substantially corresponds to the ring central axis is in particular elastically displaceable and/or bendable with respect to a second annular portion of the actuation ring which extends over a second radius area different from the first radius area and the central axis of which substantially corresponds to the ring central axis. The first radius area is therefore located within or outside the second radius area. Such an elasticity of the actuating ring results in that due to its elastic deformation, the latter facilitates the positive coupling to the first coupling component, in particular upon transition from the frictional fit state into the form-fit state. In case a relative position of the actuating ring with respect to the first coupling component does not permit a positive coupling without any additional relative movement, this relative movement can in fact be realized and/or driven by the elastic deformation. In other words, either the actuating ring deforms such that it reaches a relative position with respect to the first coupling component in which a positive coupling is permitted, or a force, in particular a spring force results from the elastic deformation of the actuating ring, which acts onto the actuating ring so as to drive the latter in the direction of a relative position with respect to the first coupling component, in which a positive coupling is permitted. It is thus achieved that the shifting device can simply and quickly transit to the form-fit state. In other words, a high shifting comfort is ensured.

Due to the fact that the first coupling component and the second coupling component can be positively connected to each other via the actuating ring, the latter may also be referred to as a clutch disk.

Preferably, a spring means acting in the direction of the open state is arranged axially between the first frictional fit ring and the third frictional fit ring, the spring means being preferably an annular wave spring assembly. The spring means may alternatively also be a helical spring assembly or an annular spring. The spring means may be unloaded in the open state. In the frictional fit state and in the form-fit state, the spring means however applies a force in the direction of the open state on the first and the third frictional fit ring. In connection with the frictional fit rings, the open state may also be referred to as a ventilation state. It is thus achieved that the frictional fit rings are spaced apart from each other in the open state. So-called drag torques are thus reduced. Furthermore, the elements of the shifting device are always in a defined position due to the spring load.

A spring means acting in the direction of the open state can additionally be arranged axially between the third frictional fit ring and the actuating ring, the spring means being preferably an annular wave spring assembly. In the frictional fit state and in the form-fit state, this spring means applies a force in the direction of the open state on the third frictional fit ring and the actuating ring. The aforementioned effects and advantages act here in an analogous way.

The spring means may simultaneously act as a return spring for an actuator coupled to the actuating ring. Further return springs are then no longer required.

In one variant, the spring means arranged between the third frictional fit ring and the actuating ring preloads in the open state the actuating ring against a stop provided on the third frictional fit ring. In this variant, the third frictional fit ring and the actuating ring are thus also preloaded against each other in the open state. The stop can for example be a retaining ring arranged on the third frictional fit ring. Due to the preload, it is possible to achieve a shorter shifting travel which results in a smaller space requirement of the shifting device. The spring travel is thus simultaneously reduced, which may lead to higher fatigue limits of the spring means. The synchronous moment is then generally built up more rapidly upon shifting from the open state into the frictional fit state. This fast and defined synchronizing is usually perceived as a high shifting comfort.

Preferably, the spring means arranged between the third frictional fit ring and the actuating ring is arranged at least in sections radially within the spring means arranged between the first frictional fit ring and the third frictional fit ring. The spring means thus extend at least in sections concentrically. A particularly compact structure of the shifting device is thus achieved.

In a further development, an actuator is provided which is operatively connected with the actuating ring and ensures, along with the spring means for example, that it is selectively transferred into an open position associated with the open state, a frictional fit position associated with the frictional fit state, and a form-fit position associated with the form-fit state, the actuator being in particular adapted to be operated in a force-controlled manner and being an electrical or hydraulic actuator. The actuator is for example a hydraulic cylinder or an electric linear drive having an electric motor and a spindle. Due to the force control, the different states of the shifting device may each be approached in a smooth and defined manner. A high shifting comfort is therefore achieved.

A force-controlled actuator furthermore offers the possibility to realize a synchronization of the coupling components with another force than the subsequent coupling with a frictional fit. The coupling with a frictional fit can also be realized at different force levels each associated with a maximum transmittable torque depending on the torque to be transmitted.

The open position, the frictional fit position and the form-fit position are preferably adjacent along the ring central axis. The actuating ring thus has to be displaced along the ring central axis to adjust these positions. Such a displacement is adapted to be simply realized in an automated manner. The different positions can furthermore be realized so as to have only small distances. A fast change of positions and a compact structure of the shifting device are therefore ensured.

The actuator can be coupled to the actuating ring in the direction of the ring central axis via an intermediate ring, the intermediate ring being in particular configured in a resilient manner in the direction of the ring central axis. Therefore, the actuator does not directly engages the actuating ring to displace the latter along the ring central axis, but the intermediate ring. The use of an intermediate ring permits the coupling of different actuators with the actuating ring. The intermediate ring may thus act as an adapter between the actuator and the actuating ring. In case the intermediate ring is configured in a resilient manner, a certain decoupling of the actuating speed of the actuator, thus a travel speed of the piston, and of a meshing speed can be obtained. The meshing speed is meant to be the speed at which the toothing of the actuating ring engages into the teething of the first coupling component. The travel speed of the piston may for example be limited by a maximum oil pressure or a restricted oil volume flow. The meshing speed can in particular be increased by the spring action of the intermediate ring. Therefore, due to the actuator, a certain prestress is first built up and is then used for the meshing. It is always possible to use a separate spring element instead of a resiliently configured intermediate ring. This leads to a quick and reliable meshing.

Furthermore, the resiliently configured regions of the intermediate ring can be configured as lever arms. An actuating force produced by the actuator is thus introduced into the actuating ring via these lever arms. It is therefore possible to obtain particularly high meshing forces and thus high meshing speeds.

In case a spring means acting in the direction of the open state is arranged between the first frictional fit ring and the third frictional fit ring and/or between the third frictional fit ring and the actuating ring, it is of course necessary to overcome the associated spring forces upon meshing.

The intermediate ring can have an offset rim region and can then be referred to as a pressure pot due to its shape.

The third frictional fit ring can also be connected with the actuating ring and optionally with the actuator or an intermediate ring cooperating with the actuator by means of a bayonet connector. Preferably, closing arms extend from the third frictional fit ring, which in the mounted state extend substantially along the ring central axis and engage through the component to be connected with the actuator, i.e. the actuating ring and the actuator or the intermediate ring. To this end, windows or recesses may be provided on the actuating ring, the actuator and/or the intermediate ring. The ends of the closing arms are provided with hook elements which extend in the peripheral direction with respect to the ring central axis and which axially engage behind the actuating ring, the actuator and/or the intermediate ring after a relative rotation with respect to the third frictional fit ring and therefore axially connect the aforementioned elements with each other. The axial connection can be configured such that an axial relative movement of the connected parts to each other is permitted within predetermined limits. Preferably, the closing arms are all provided with hook elements in both peripheral directions. Irrespective of the orientation of the relative torsion, it is then possible to establish a connection. Depending on the size of the hook elements in the peripheral direction, a certain relative rotary mobility of the connected parts may also be possible while maintaining the axial connection. As the bayonet connector is a compact and inexpensive but reliable lock, it is possible to create a compact and inexpensive shifting device. In particular, due to the bayonet connector, no further joining elements or joining operations such as welding operations are necessary.

Due to the bayonet connector, spring assemblies arranged between the components that are connected by means of this bayonet connector can be prestressed in a defined manner. A spring assembly which is arranged between the actuating ring and the third frictional fit ring can for example be prestressed axially in a defined manner. Such a spring assembly can serve to apply a certain axial force onto the friction cones in the frictional fit sate without bringing the actuating ring in a positive engagement with the first coupling component. Using such a prestress, a defined actuation of the shifting device is obtained. The frictional fit state can in particular be approached in a defined manner. Furthermore, drag torques are avoided.

The bayonet connector furthermore permits to preassemble the aforementioned components so as to form an assembly. The mounting of the shifting device is thus simplified.

Furthermore, an end of the actuator which is axial with respect to the ring central axis and faces the actuating ring can be configured so as to be resilient in the direction of the ring central axis, or the actuating ring can be coupled to the actuator via a spring element separate from the actuator. In this connection, the same effects and advantages as already explained in connection with the resiliently configured intermediate ring are obtained. Reference is made to the explanations above. The actuator can also be coupled to the actuating ring via a lever arm. To this end, reference is again made to the above explanations.

In one variant, the actuator is coupled to the third frictional fit ring via a spring element. The actuator engages through the actuating ring which is provided to this end with one or more windows or recesses. However, the actuator is simultaneously coupled to the actuating ring via a spring element. As a result of an adaptation of the two spring elements in accordance with the above explanations, a reliable and quick reaching of the frictional fit state and the form-fit state can be ensured. High meshing speeds are thus obtained, a high shifting comfort being at the same time given.

Both coupling components may be shafts that are rotatable about the ring central axis. Alternatively, one of the coupling components may be a shaft that is rotatable about the ring central axis, and the other of the coupling components may be a housing portion. The shifting device may be referred to as a clutch if it couples two rotatable shafts with each other. In case one of the coupling components is a housing portion, the shifting device may be referred to as a brake.

According to a further development, the actuating ring comprises an external toothing adapted to be coupled to the second coupling component, and an internal toothing adapted to be coupled to the first coupling component, wherein in the form-fit state, the external toothing is in particular coupled to the second coupling component and the internal toothing is coupled to the first coupling component. The actuating ring can be disc-shaped. A high torque can respectively be transmitted in a small space by means of the toothings. This leads to a compact structure of the shifting device. Such toothings are further adapted to be manufactured using known machines and methods, such that this can be realized in a fast and cost-effective manner. Connections based on toothings are furthermore very reliable.

In the open state and in the frictional fit state, the internal toothing is spaced apart from an associated external toothing of the first coupling component in the direction of the ring central axis, and the external toothing is permanently rotationally coupled to the second coupling component. Therefore, the internal toothing does not engage into the external toothing of the first coupling component. A coupling with a form-fit is thus not yet present. The desired distance can be adjusted via the force-controlled actuator.

In one variant, the internal toothing comprises two teeth rows which are offset to each other along the ring central axis, a teeth row turned towards the first coupling component having a larger torsional flank clearance in comparison with an associated external toothing of the first coupling component than a teeth row turned away from the first coupling component. To this end, the teeth of the row turned towards the first coupling component are narrower than the teeth of the teeth row turned away from the first coupling component at least in their circumferential extension. These teeth can also be referred to as advanced teeth. Due to the large torsional flank clearance, it is particularly simple to couple the internal toothing of the actuating ring to the external toothing of the first coupling component. Relative positions in which there is a "tooth-to-tooth" are thus prevented. Due to the engagement of the teeth row turned towards the first coupling component into the external toothing thereof, it is particularly easy to bring the teeth row turned away from the first coupling component into engagement. This teeth row can be designed for the transmission of a maximum torque.

In case a "tooth-to-tooth"-position is still achieved, a low speed difference is necessary to bring the toothings into engagement. In case the shifting device is mounted in a motor vehicle, such a speed differential can be achieved by the use of a transmission drag torque, the specific piloting of a clutch, by a clutch drag torque or by a release of the drive train. Alternatively, the toothings can already be brought into engagement before the speed synchronization is entirely completed.

Preferably, as seen in the direction of the ring central axis, teeth of the teeth row turned towards the first coupling component and teeth of the teeth row turned away from the first coupling component alternate at the circumference. In each of the two teeth rows, every second tooth is so to speak omitted. It is therefore particularly easy to bring the toothing of the actuating ring into engagement with the external toothing of the first coupling component.

Alternatively, the teeth of the two teeth rows may also be arranged one behind the other as seen in the direction of the ring central axis.

Preferably, the internal and/or the external toothings of the first coupling component, of the second coupling component, of the frictional fit rings and/or of the actuating ring are plane toothings. Such toothings can be manufactured in a particularly simple and cost-effective manner.

In some of the aforementioned variants, the third frictional fit ring is not directly involved in the connection of the coupling components with a frictional fit, but cooperates with the second frictional fit ring which in turn forms a connection of the coupling components with a frictional fit together with the first frictional fit ring. To ensure a continuous and systematic designation of the components of the shifting device, the term of the third frictional fit ring is however also used for such variants.

Additionally, the object is achieved by a motor vehicle transmission of the type initially mentioned which comprises a shifting device according to the invention. Such a motor vehicle transmission has a particularly compact structure and ensures a high shifting comfort.

Figure 2:
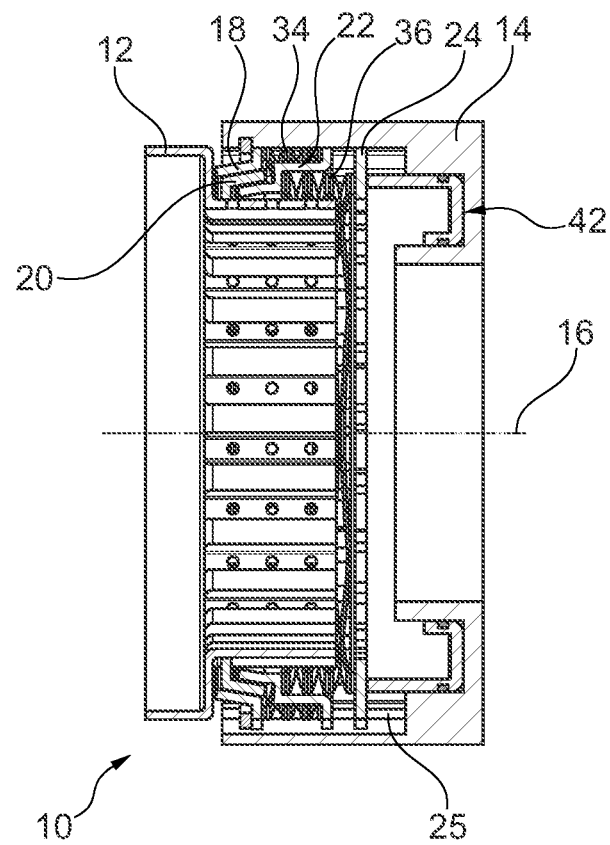
Figure 3:
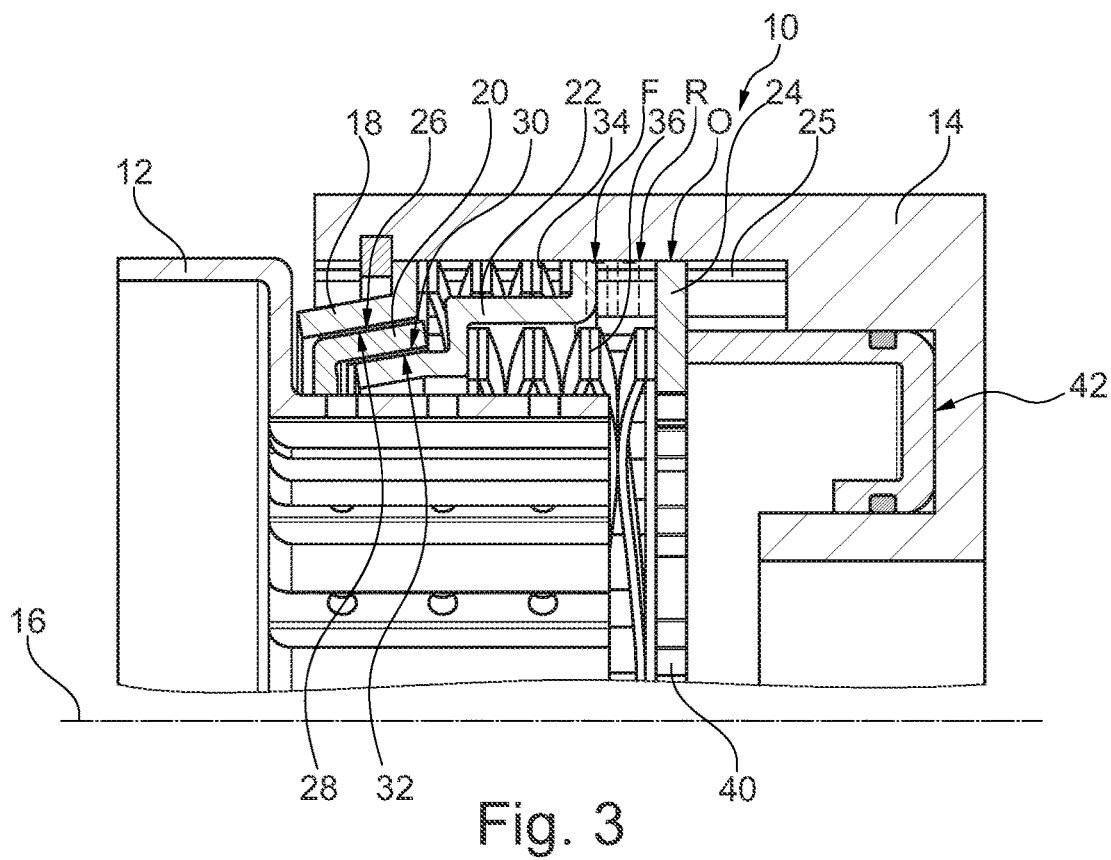
Figure 4:
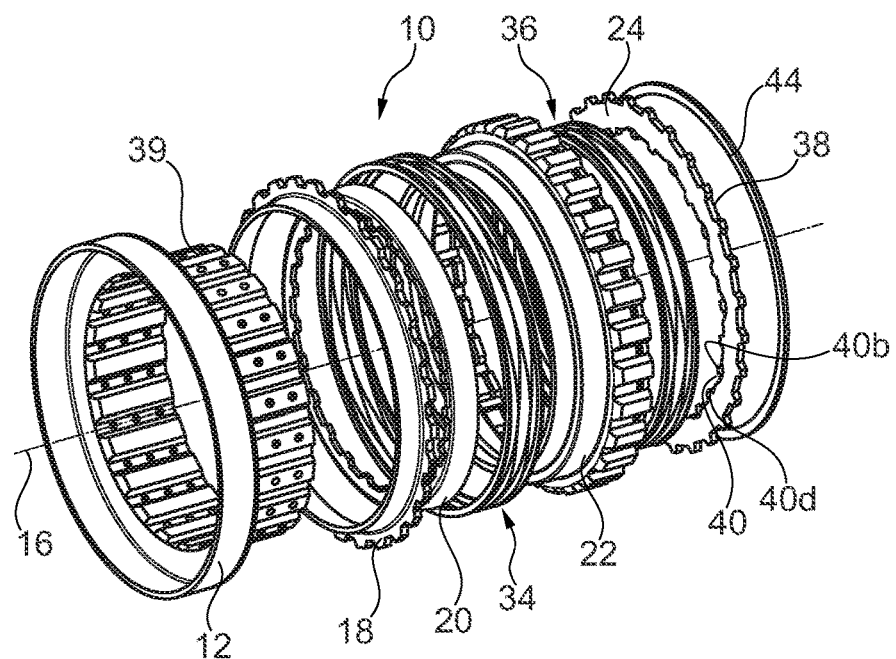
Figure 5:
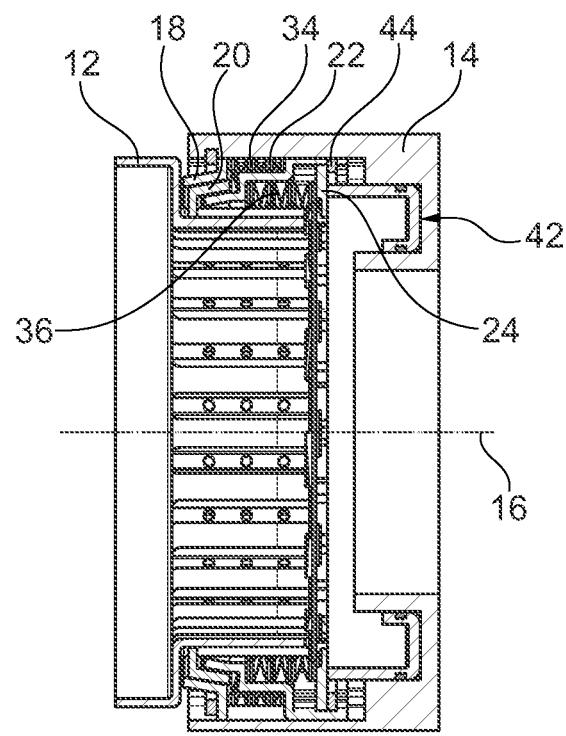
Figure 6:
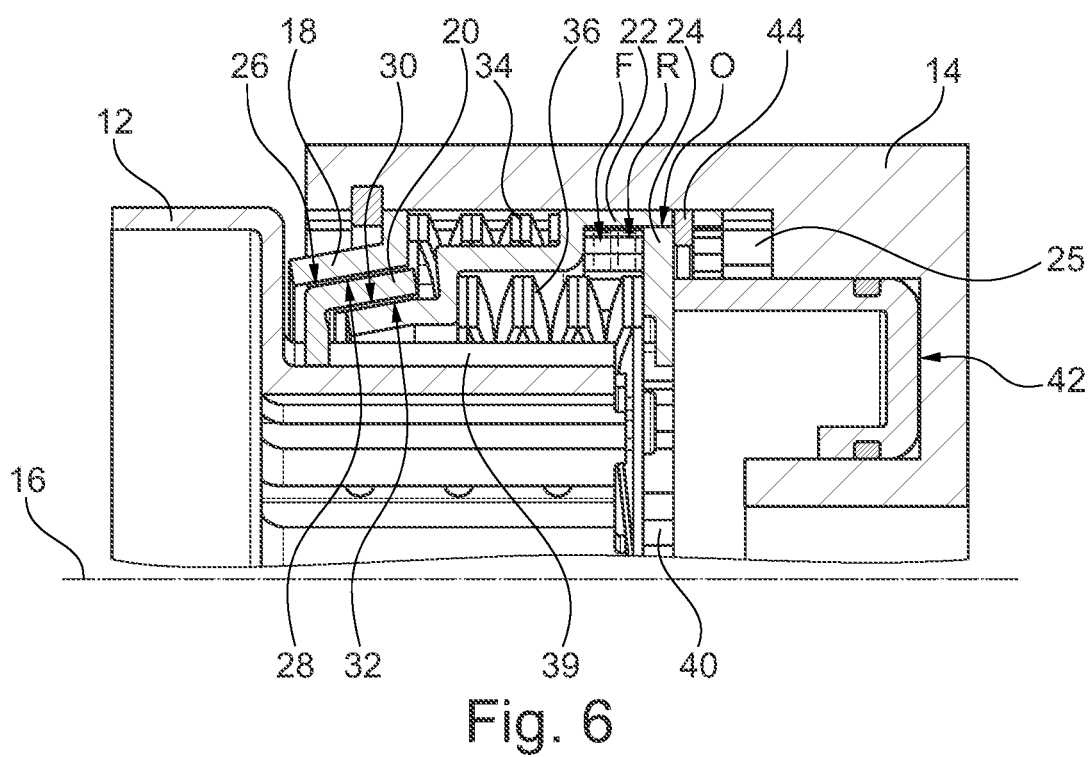
Figure 7:
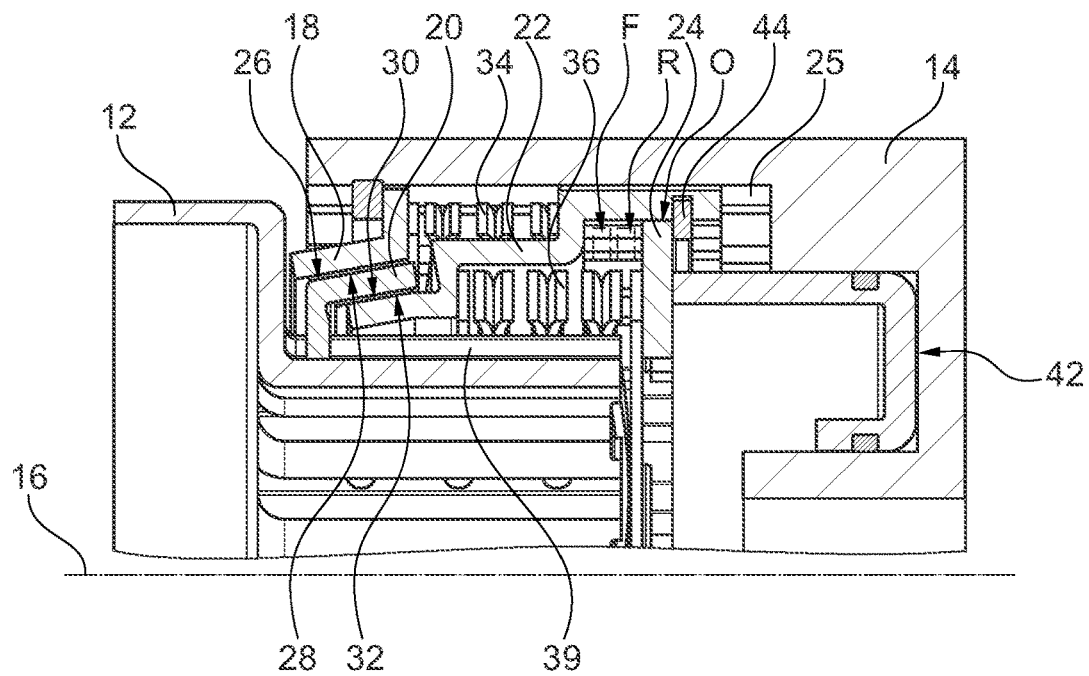
Figure 8:
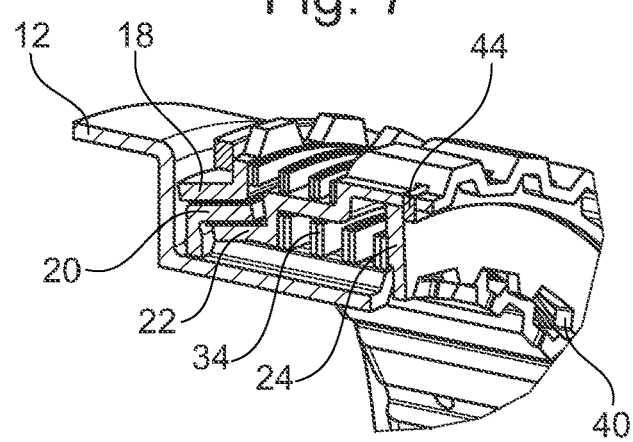
Figure 9:
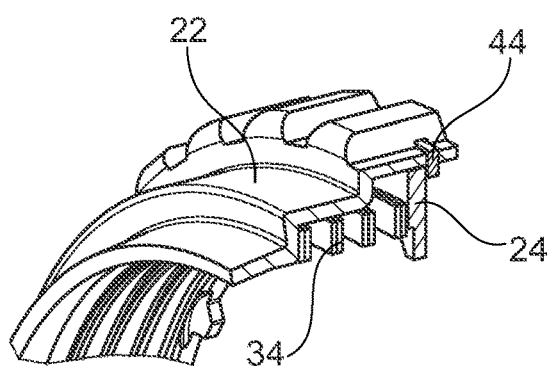
Figure 10:
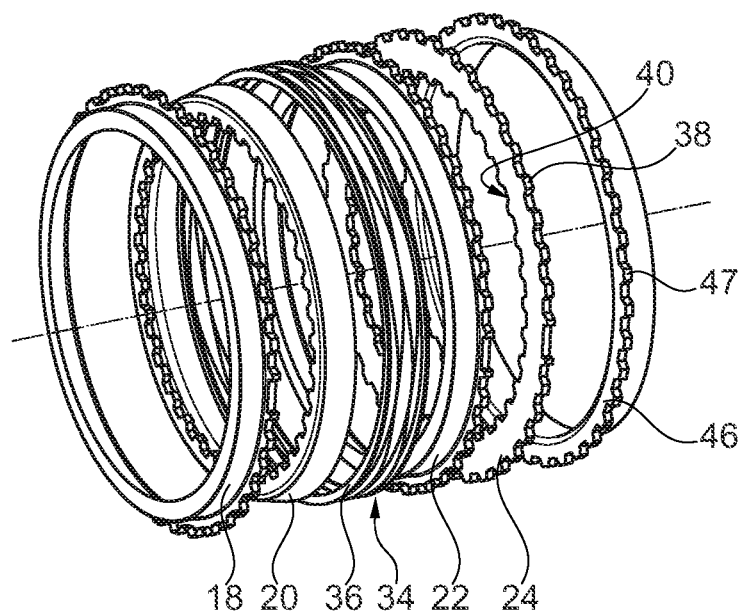
Figure 11:
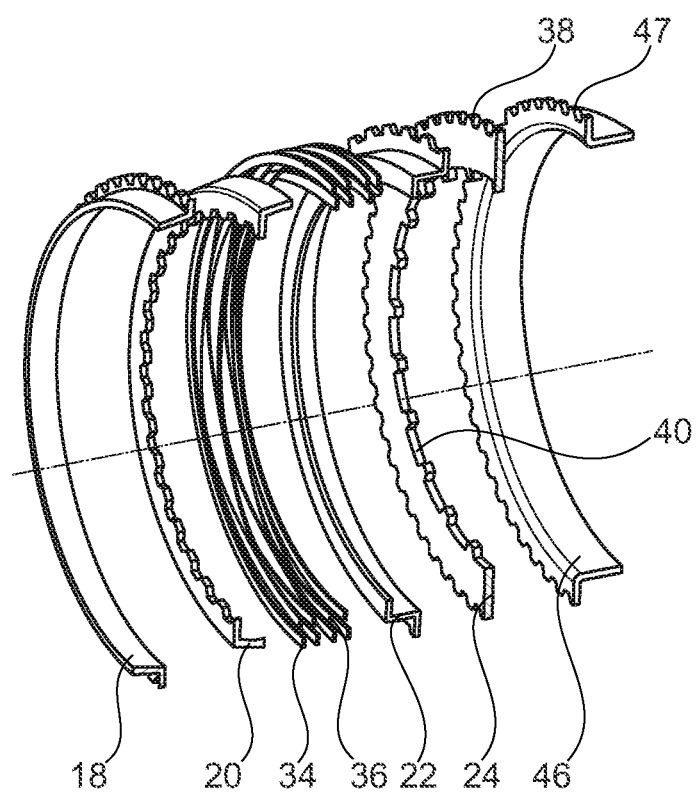
Figure 12:
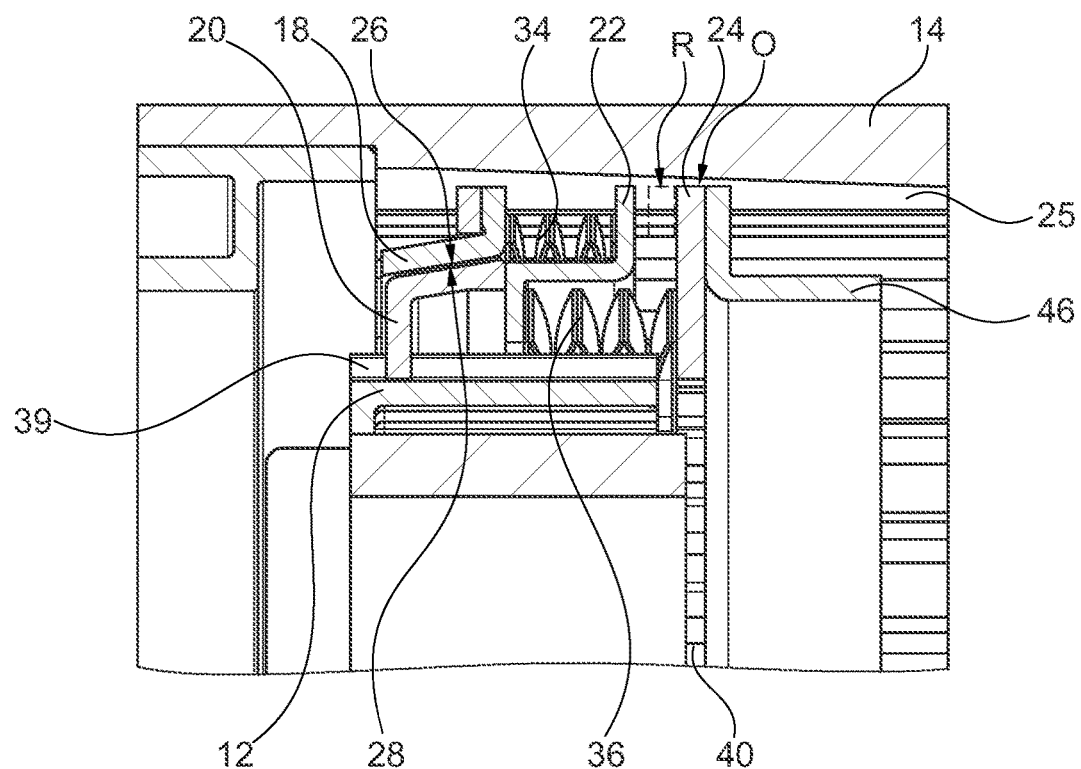
Figure 13:
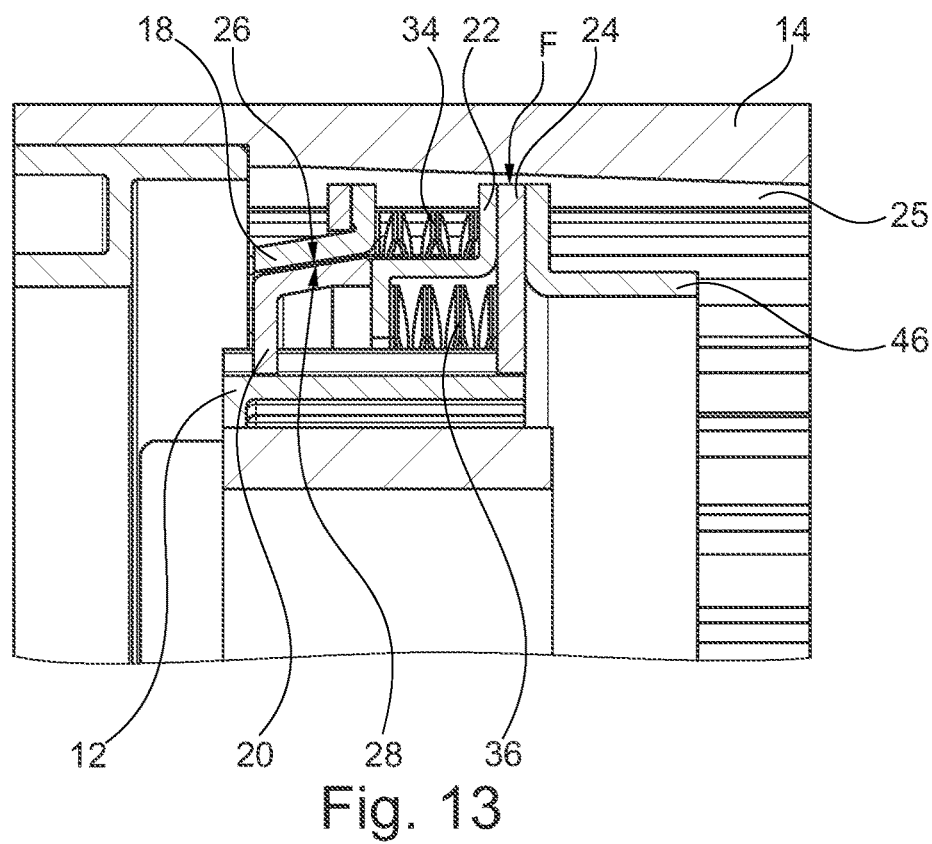
Figure 14:
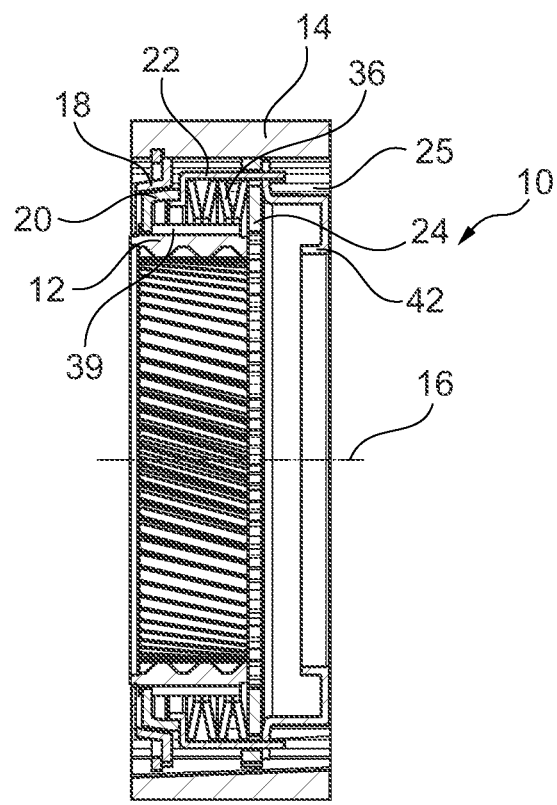
Figure 15:
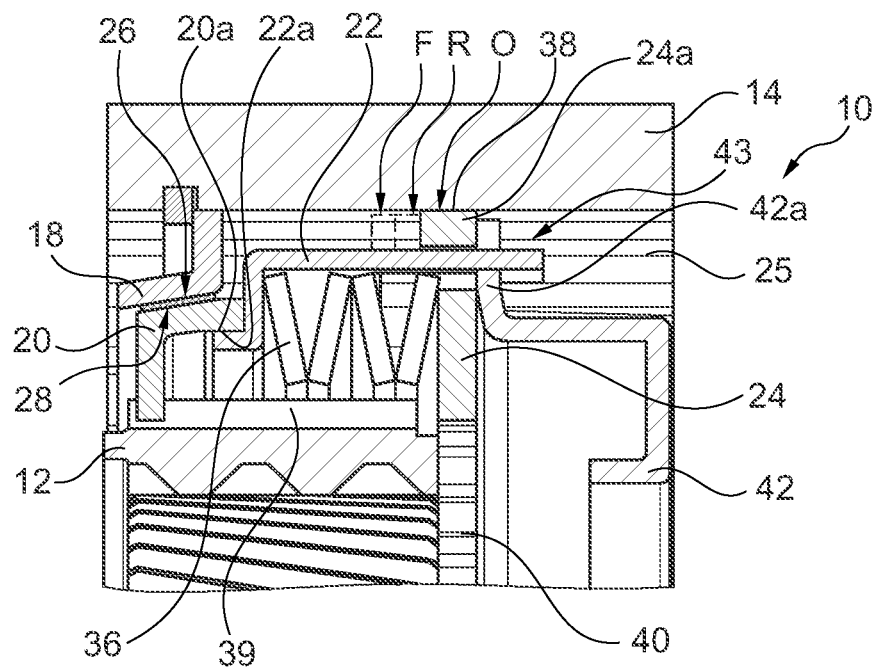
Figure 16:
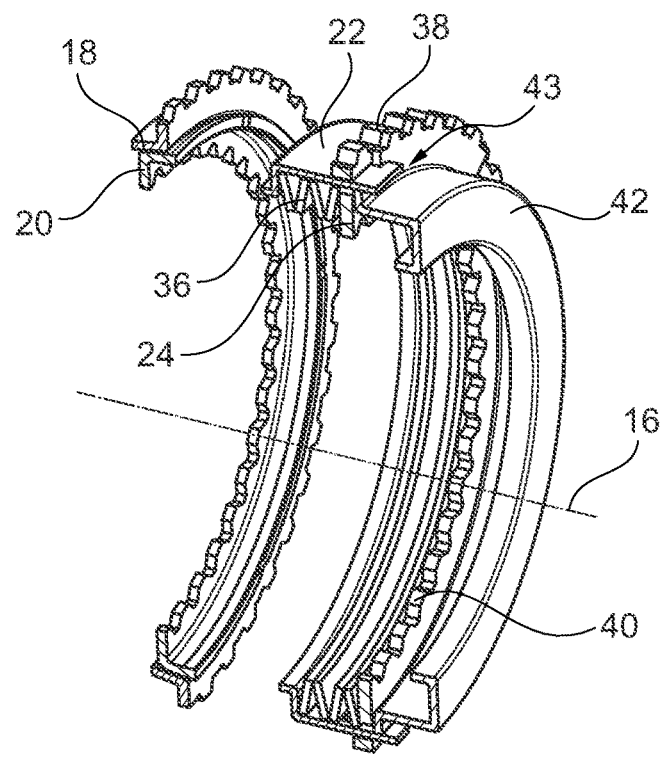
Figure 17:
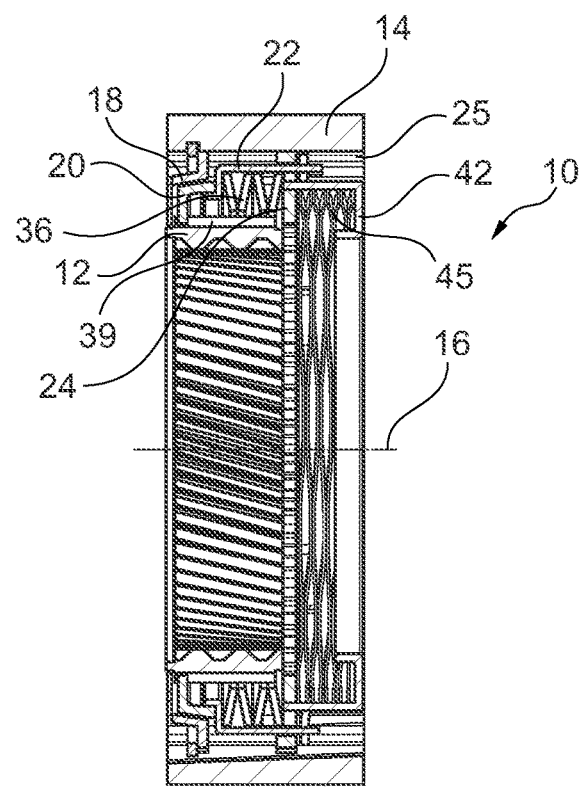
Figure 18:
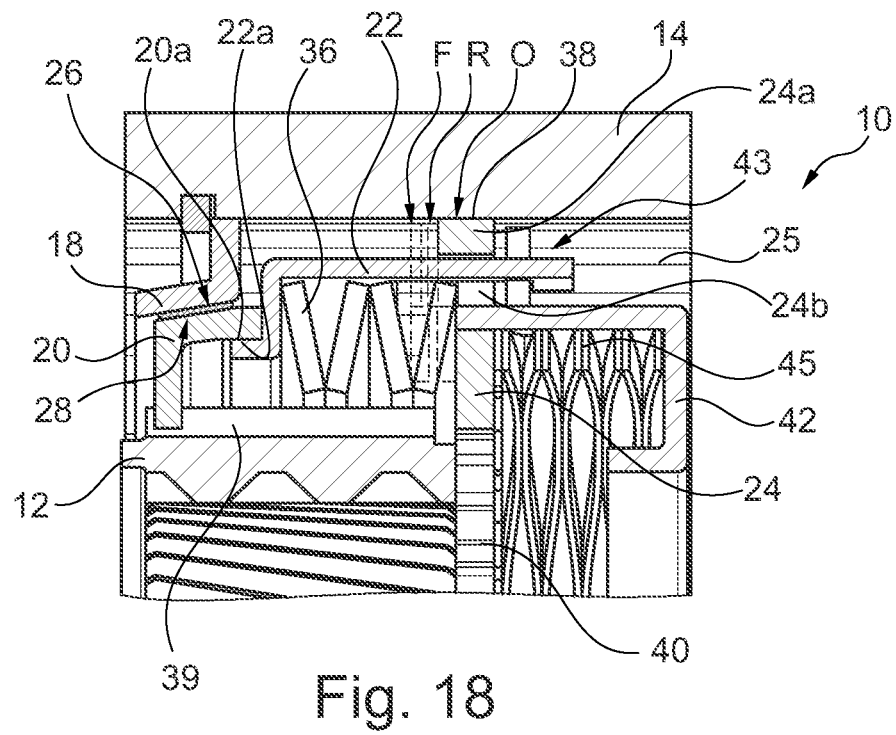
Figure 19:
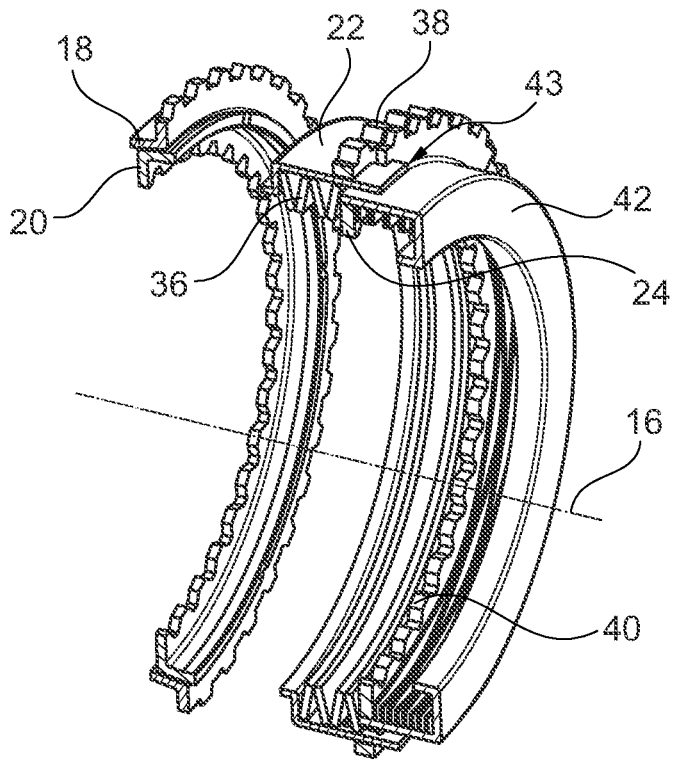
Figure 20:
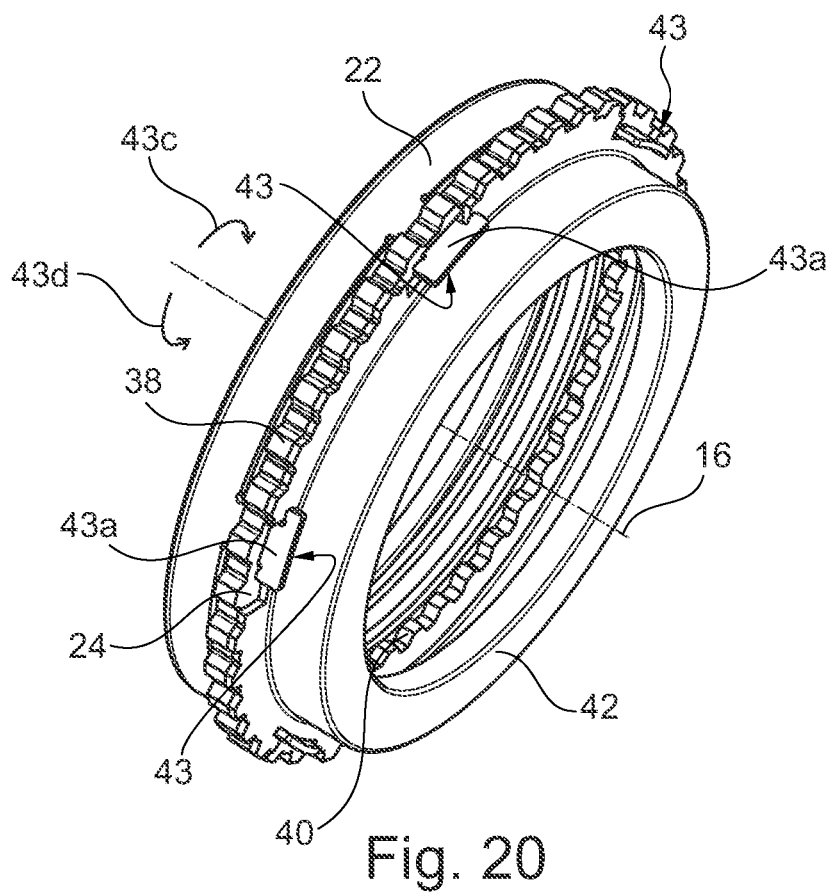
Figure 21:
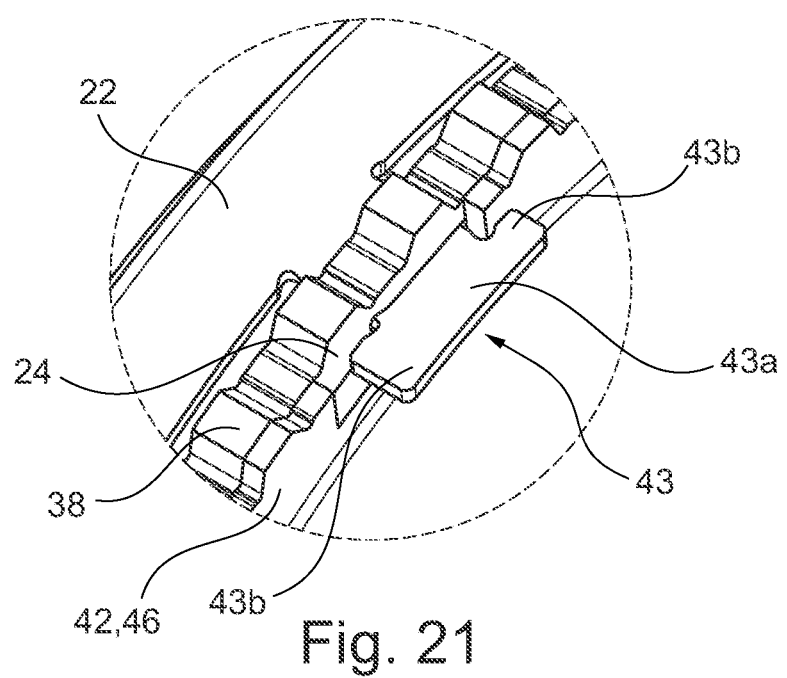
Figure 22:
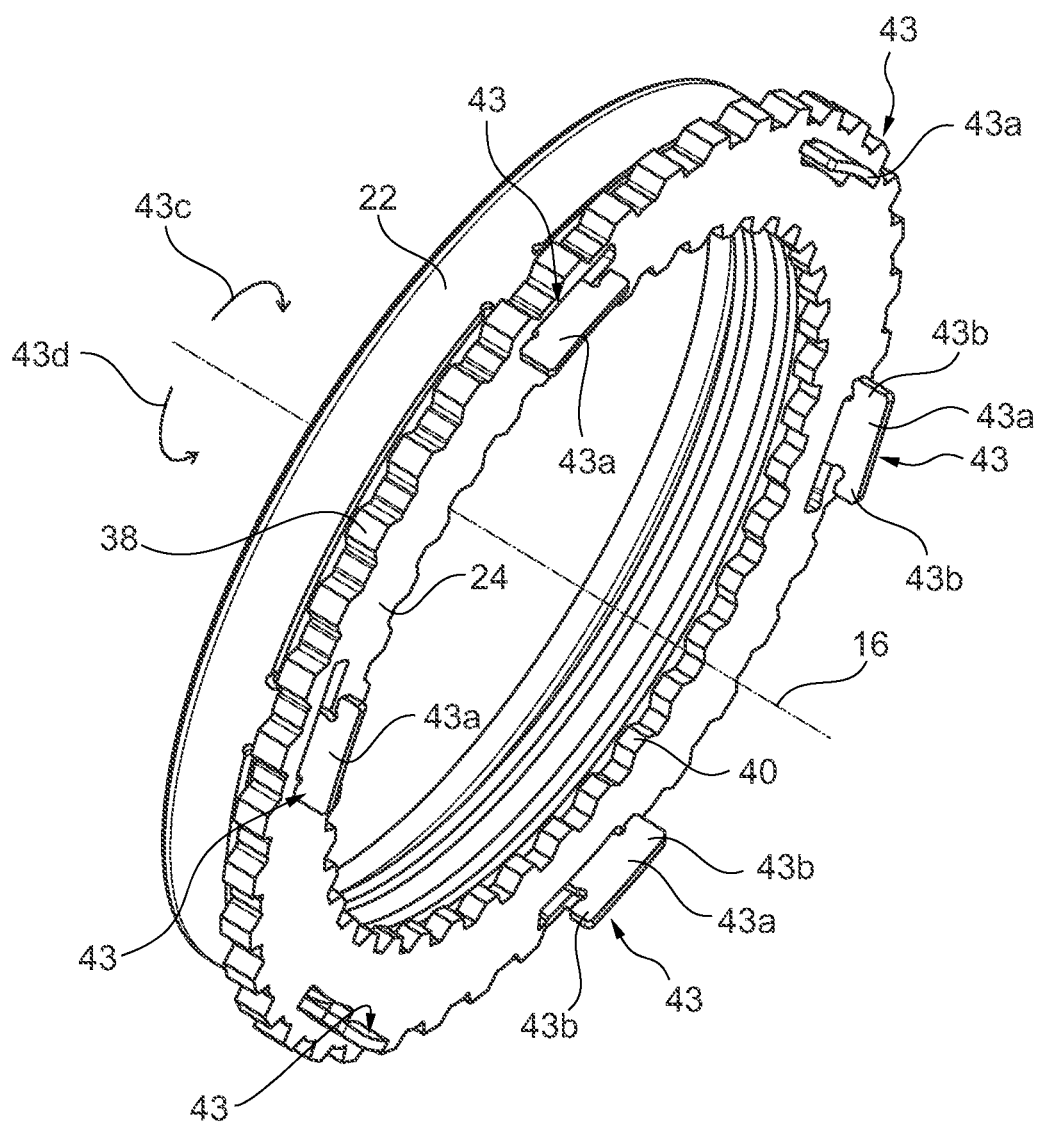

The invention is explained below with reference to different example embodiments which are shown in the accompanying drawings which illustrate:

FIG. 1 a shifting device according to the invention and according to a first embodiment in an exploded view, FIG. 2 the shifting device according to the invention and according to the first embodiment in a longitudinal sectional view, FIG. 3 a detail of FIG. 2, FIG. 4 a shifting device according to the invention and according to a second embodiment in an exploded view, FIG. 5 the shifting device according to the invention and according to the second embodiment in a longitudinal sectional view, FIG. 6 a detail of FIG. 5, FIG. 7 a detail of FIG. 5, the cut extending in a slightly rotated plane compared with FIG. 6, FIG. 8 the shifting device according to the invention and according to the second embodiment in a perspective cut view, FIG. 9 the shifting device according to the invention and according to the second embodiment in another perspective view, FIG. 10 a shifting device according to the invention and according to a third embodiment in an exploded view, FIG. 11 the shifting device of FIG. 10 in a cut exploded view, FIG. 12 the shifting device according to the invention and according to the third embodiment in an open state and in a longitudinal sectional view, FIG. 13 the shifting device according to the invention and according to the third embodiment in a form-fit state in a longitudinal sectional view, FIG. 14 a shifting device according to the invention and according to a fourth embodiment in a longitudinal sectional view, FIG. 15 a detail of the shifting device of FIG. 14, FIG. 16 a further detail of the shifting device of FIG. 14 in an exploded view, FIG. 17 a shifting device according to the invention and according to a fifth embodiment in a longitudinal sectional view, FIG. 18 a detail of the shifting device of FIG. 17, FIG. 19 a further detail of the shifting device of FIG. 17 in an exploded view, FIG. 20 a preassembled assembly of a shifting device according to the invention and according to the fourth or the fifth embodiment, FIG. 21 a detail of the assembly of FIG. 20, and FIG. 22 the assembly of FIG. 20 in an intermediate state upon mounting.

FIGS. 1 to 3 show a shifting device 10 according to a first embodiment which comprises a first coupling component 12 and a second coupling component 14.

In the illustrated embodiment, both coupling components 12, 14 are shafts or shaft portions which are rotatable about a ring central axis 16.

Furthermore, the shifting device 10 comprises a first frictional fit ring 18 which is non-rotatably coupled to the second coupling component 14 so as to be displaceable along the ring central axis 16, a second frictional fit ring 20 which is non-rotatably coupled to the first coupling component 12 so as to be displaceable along the ring central axis 16, a third frictional fit ring 22 which is non-rotatably coupled to the second coupling component 14 so as to be displaceable along the ring central axis 16, and an actuating ring 24 which is non-rotatably coupled to the second coupling component 14 so as to be displaceable along the ring central axis 16.

To this end, the frictional fit rings 18, 20, 22 each have a toothing via which they are coupled to toothings 39 and 25 on the respective associated coupling component 12 and 14, respectively, having only axially extending teeth.

A friction cone 26 is provided on the first frictional fit ring 18 and is adapted to be selectively rotationally coupled to a friction cone 28 arranged on the second frictional fit ring 20 with a frictional fit.

Furthermore, a further friction cone 30 is provided on the second frictional fit ring 20, which is adapted to be rotationally coupled to a friction cone 32 arranged on the third frictional fit ring 22 with a frictional fit. Optionally, friction linings may be mounted to the frictional fit rings.

A spring means 34 is furthermore arranged axially between the first frictional fit ring 18 and the third frictional fit ring 22. In the illustrated embodiment, it is an annular wave spring assembly.

A further spring means 36 is provided axially between the third frictional fit ring 22 and the actuating ring 24. This spring means 36 is also configured as an annular wave spring assembly.

The spring means 36 is here located at least in sections radially within the spring means 34.

The actuating ring 24 comprises an external toothing 38 permanently coupled to the second coupling component 14, and an internal toothing 40 which is adapted to be selectively coupled to an external toothing 39 on the first coupling component 12.

Both the internal toothing 40 and the external toothing 38 are configured as plane toothings. The same applies to the toothings on the first coupling component 12 and the second coupling component 14 cooperating therewith.

The actuating ring 24 is further operatively connected with an actuator 42 which is a hydraulic cylinder in the illustrated embodiment.

The actuator 42 operates in particular in a force-controlled manner.

The actuating ring 24 can be transferred into an open position O illustrated in FIG. 3 by means of this actuator 42 onto which no force is applied in this state, and by means of the spring means 34, 36. This position corresponds to an open state of the shifting device 10 in which the first coupling component 12 is rotationally decoupled from the second coupling component 14.

Starting from this open position O, the actuating ring 24 can be transferred into an frictional fit position R using the then actuated actuator 42.

This position is shown in FIG. 3 only schematically and corresponds to a frictional fit state of the shifting device 10 in which the first frictional fit ring 18 and the second frictional fit ring 20 are rotationally coupled with a frictional fit.

This is achieved by a coupling of the friction cones 26, 28.

In the illustrated embodiment, the friction cones 30, 32 are additionally coupled with a frictional fit in the frictional fit state.

The frictional fit position R of the actuating ring 24 is located along the ring central axis 16 adjacent to the open position O. In FIG. 3, the actuating ring 24 is thus slightly offset to the left.

However, the internal toothing 40 is still spaced apart from an associated external toothing 39 of the first coupling component 12.

The actuating ring 24 can also be transferred into a form-fit position F adjacent to the frictional fit position R by the actuator 42.

In this position, the external toothing 38 of the actuating ring 24 is coupled to the second coupling component 14, and the internal toothing 40 is coupled to the first coupling component 12.

On the basis of the frictional fit position R, the actuating ring 24 is thus shifted to the left in FIG. 3. The form-fit position F is thus adjacent to the frictional fit position R along the ring central axis 16.

The form-fit position F corresponds to a form-fit state of the shifting device 10 in which the first coupling component 12 and the second coupling component 14 are rotationally coupled with a form-fit via the actuating ring 24.

In the form-fit state F, the friction cones 26, 28 and the friction cones 30, 32 are additionally also coupled in pairs with a frictional fit.

The spring means 34, 36 always counteract the displacement of the actuating ring 24 out of the open position O. In other words, they act in the direction of the open state of the shifting device 10.

FIGS. 4 to 9 show a second embodiment of the shifting device 10. Merely the differences to the first embodiment are explained below.

In this embodiment, the spring means 36 arranged between the third frictional fit ring 22 and the actuating ring 24 is preloaded against a stop 44 provided on the third frictional fit ring 22 in the open state of the shifting device 10 in which the actuating ring 24 is in the open position O (see FIG. 6).

In the illustrated embodiment, this stop 44 is configured as a retaining ring which is placed in a groove of the third frictional fit ring 22.

The internal toothing 40 further comprises two teeth rows 40a, 40b which are offset to each other along the ring central axis 16.

The teeth row 40a turned towards the first coupling component 12 has a larger torsional flank clearance than the teeth row 40b turned away from the first coupling component 12.

As seen in the direction of the ring central axis 16, the teeth of the two teeth rows 40a, 40b alternate at the circumference.

A simple bringing into engagement of the internal toothing 40 with the associated external toothing on the first coupling component 12 is thus achieved.

FIGS. 10 to 13 show a third example embodiment of the shifting device 10. Again, merely the differences to the first embodiment are explained.

The third frictional fit ring 22 is here modified.

In contrast to the first two embodiments, the latter does not have any friction cone 32.

The further friction cone 30 on the second frictional fit ring 20 can then be omitted.

Therefore, the third embodiment comprises altogether only two friction cones 26, 28.

However, the third frictional fit ring 22 axially contacts the second frictional fit ring 20.

Furthermore, an intermediate ring 46 is provided between the actuating ring 24 and the actuator 42 which is not illustrated in detail, and is rotationally coupled to the second coupling component 14 and the toothing 25 thereof via an external toothing 47.

The intermediate ring 46 is displaceable along the ring central axis 16 with respect to the second coupling component 14.

FIGS. 14 to 16 show a fourth example embodiment of the shifting device 10. In the explanation thereof, merely the differences to the third embodiment are illustrated.

The actuating ring 24 now has a rim portion 24a which is widened with respect to a centric portion. The actuating ring 24 is coupled to the second coupling component 14 via this rim portion 24a.

The rim portion 24a is completely circumferential with respect to the ring central axis 16.

In comparison with the aforementioned embodiments, merely a low surface pressure is acting on the second coupling component 14.

Furthermore, the third frictional fit ring 22 is again modified.

It now comprises a mating centering face 22a which cooperates with a centering face 20a provided on the second frictional fit ring 20. The second frictional fit ring 20 is thus centered via the third frictional fit ring 22.

Furthermore, an end 42a of the actuator 42 which faces the actuating ring 24 is configured in a resilient manner in the direction of the ring central axis 16.

The end 42a further constitutes a lever arm which extends in the radial direction. On the basis of an actuation of the actuator 42, the actuating ring 24 is thus actuated via the resilient lever arm to reach the frictional fit position or the form-fit position.

A fifth example embodiment which is shown in FIGS. 17 to 19 is explained below in comparison with the fourth embodiment.

The actuator 42 now no longer has any resiliently configured end 42a, but is coupled to the third frictional fit ring 22 via the spring element 36.

To this end, the actuator 42 engages through one ore more openings 24b which are provided in the actuating ring 24.

An additional spring element 45 which is configured as a disk spring assembly is provided along the ring central axis 16 between the actuator 42 and the actuating ring 24.

The third frictional fit ring 22 is coupled to the actuating ring 24 and the actuator 42 via a bayonet connector 43 both in the fourth and in the fifth embodiment (see also FIGS. 20 to 22).

To this end, the bayonet connector 43 has a plurality of closing arms 43a which extend from the third frictional fit ring 22 and the ends of which that are turned away from the third frictional fit ring are provided with hook elements 43b which engage behind the actuating ring and/or the actuator in a direction which corresponds to the ring central axis.

In the represented examples, the bayonet connector 43 is configured so as to act on both sides. Starting from one closing arm 43a, hook elements 43b are thus provided on both peripheral sides.

The actuating disk 24 can be mounted to the third frictional fit ring in that the closing arms 43a engage through openings provided on the actuating disk 24 and a relative rotation of the actuating disk 24 with respect to the third frictional fit ring is carried out in a first direction of rotation 43c (see FIG. 22).

The actuator 42 can then be mounted in that the closing arms 43a engage through recesses provided on the actuator 42 and the actuator 42 is swivelled in a second direction of rotation 43d with respect to the third frictional fit ring 22 (see FIGS. 20 and 21). In the represented example embodiments, the second direction of rotation 43d is opposite the first direction of rotation 43c.

The third frictional fit ring 22, the actuating ring 24, the actuator 42 and optionally the spring element 45 generally constitute a preassembled unit.

In all embodiments shown, the actuating ring 24 may be elastic to facilitate the meshing of the internal toothing 49 into the external toothing 39.

An actuating force is applied onto the actuating ring 24 in a radially exterior region by the actuator 42 or the intermediate ring 46 for a shifting from the open state into the frictional fit state or the form-fit state. The actuating ring 24 is therefore deformed elastically such that a radius area arranged further inwards is elastically displaced and/or bent with respect to the actuating region.

Though specific features are described only for one of the embodiments, these features can also be transferred individually or in groups to the other embodiments.

In this context, the intermediate ring 46 can for example be transferred to the first, second, fourth or fifth embodiment, or the internal toothing 40 of the second embodiment can be transferred to the remaining embodiments.

The actuation of the shifting device 10 is explained below jointly for all embodiments.

Starting from the open state illustrated in FIGS. 3, 6, 12, 15 and 18 in which the first coupling component 12 is decoupled from the second coupling component 14 and the actuating ring 24 is in the open position O, the actuating ring 24 is displaced into the frictional fit position R in a force-controlled manner by the actuator 42.

The friction cones 26, 28 are coupled to each other with a frictional fit.

In the first and in the second embodiment, the friction cones 30, 32 are additionally brought into a frictional connection.

The shifting device 10 is then in the frictional fit state.

The coupling components 12, 14 which are shafts or shaft portions in all illustrated embodiments are synchronized with regard to their speed during this shifting operation.

The force-controlled actuator 42 can apply a first force for the synchronization. After the completion thereof, the actuator 42 can than apply a higher second force by means of which the coupling with a frictional fit is produced.

The spring means 34, 36 counteract the movement of the actuating ring 24 and of the frictional fit rings 18, 20, 22. The appropriate spring forces thus have to be overcome by the actuator 42 and, if necessary, by the spring element 45.

The shifting device 10 can of course also be shifted under load.

Starting from the frictional fit position R of the actuating ring 24, the latter can be further displaced against the spring forces of the spring means 34, 36 such that the internal toothing 40 comes into engagement with the associated external toothing 39 of the first coupling component 12.

The shifting device 10 is then in the form-fit state, and the actuating ring is in the associated form-fit position F. The coupling components 12, 14 are then coupled with a form-fit.

To decouple the coupling components 12, 14, the actuator 42 is switched so as to be inactive such that the actuating ring 24 is transferred to the open position O by the spring means 34, 36 via the frictional fit position R.

The shifting device 10 transits into the open state via the frictional fit state.

Shifting devices 10 according to all embodiments may be used in a motor vehicle transmission which is not illustrated in more detail. The latter is in particular a fully automatic stepped transmission.

The invention claimed is:

1. A shifting device for a motor vehicle, comprising:
a first coupling component which is adapted to be selectively rotationally coupled to a second coupling component with a form-fit,
a first frictional fit ring which is non-rotatably coupled to the second coupling component so as to be displaceable along a ring central axis,
a second frictional fit ring which is non-rotatably coupled to the first coupling component so as to be displaceable along the ring central axis,
a third frictional fit ring which is non-rotatably coupled to the second coupling component so as to be displaceable along the ring central axis, and
an actuating ring which is non-rotatably coupled to the second coupling component so as to be displaceable along the ring central axis,
the first coupling component being rotationally decoupled from the second coupling component in an open state,
the first frictional fit ring and the second frictional fit ring being rotationally coupled with a frictional fit in a frictional fit state,
and the actuating ring being rotationally coupled with a form-fit to the first coupling component in a form-fit state,
wherein a friction cone is provided on the first frictional fit ring and is adapted to be rotationally coupled with a frictional fit to a friction cone arranged on the second frictional fit ring, and
wherein the actuating ring comprises an external toothing being splined to the second coupling component and an internal toothing being adapted to be coupled to the first coupling component.

2. The shifting device according to claim 1, wherein a centering face is provided on the second frictional fit ring and a mating centering face is provided on the third frictional fit ring, the centering face and the mating centering face cooperating to center the second frictional fit ring with respect to the ring central axis.

3. The shifting device according to claim 1, wherein the actuating ring has a completely circumferential rim portion which is widened in the direction of the ring central axis with respect to a centric portion, the actuating ring being non-rotatably coupled to the second coupling component so as to be displaceable along the ring central axis via the rim portion.

4. The shifting device according to claim 1, wherein a spring means acting in the direction of the open state is arranged axially between the third frictional fit ring and the actuating ring.

5. The shifting device according to claim 4, wherein in the open state, the spring means arranged between the third frictional fit ring and the actuating ring preloads the actuating ring against a stop provided on the third frictional fit ring.

6. The shifting device according to claim 4, wherein the spring means is an annular wave spring assembly.

7. The shifting device according to claim 1, characterized by an actuator which is operatively connected with the actuating ring and ensures that the latter is selectively transferred into an open position associated with the open state, a frictional fit position associated with the frictional fit state, and a form-fit position associated with the form-fit state.

8. The shifting device according to claim 7, wherein the open position, the frictional fit position and the form-fit position are adjacent along the ring central axis.

9. The shifting device according to claim 7, wherein the actuator is coupled to the actuating ring by means of an intermediate ring in the direction of the ring central axis.

10. The shifting device according to claim 7, wherein the third frictional fit ring is connected with the actuating ring and optionally with the actuator or with an intermediate ring cooperating with the actuator by means of a bayonet connector.

11. The shifting device according to claim 7, wherein an end of the actuator which is axial with respect to the ring central axis and which faces the actuating ring is configured so as to be resilient in the direction of the ring central axis.

12. The shifting device according to claim 7, wherein an intermediate ring is configured so as to be resilient in the direction of the ring central axis.

13. The shifting device according to claim 7, wherein the actuating ring is coupled to the actuator via a spring element separate from the actuator.

14. The shifting device according to claim 13, wherein the actuator is coupled to the third frictional fit ring via a second spring element being separate from the spring element by which the actuating ring is coupled to the actuator.

15. The shifting device according to claim 1, wherein both coupling components are shafts that are rotatable about the ring central axis or in that one of the coupling components is a shaft that is rotatable about the ring central axis and the other of the coupling components is a housing portion.

16. The shifting device according to claim 1, wherein the friction cones are coupled in the frictional fit state and/or in the form-fit state.

17. The shifting device according to claim 1, wherein the actuating ring is elastic.

18. The shifting device according to claim 17, wherein a first annular portion of the actuating ring extends over a first radius area and a central axis of the first annular portion substantially corresponds to the ring central axis, the first annular portion being elastically displaceable and/or bendable with respect to a second annular portion of the actuation ring which extends over a second radius area different from the first radius area, a central axis of the second annular portion substantially corresponding to the ring central axis.

19. A motor vehicle transmission, comprising a shifting device having:
a first coupling component which is adapted to be selectively rotationally coupled to a second coupling component with a form-fit,
a first frictional fit ring which is non-rotatably coupled to the second coupling component so as to be displaceable along a ring central axis,
a second frictional fit ring which is non-rotatably coupled to the first coupling component so as to be displaceable along the ring central axis,
a third frictional fit ring which is non-rotatably coupled to the second coupling component so as to be displaceable along the ring central axis, and an actuating ring which is non-rotatably coupled to the second coupling component so as to be displaceable along the ring central axis, the first coupling component being rotationally decoupled from the second coupling component in an open state, the first frictional fit ring and the second frictional fit ring being rotationally coupled with a frictional fit in a frictional fit state, and the actuating ring being rotationally coupled with a form-fit to the first coupling component in a form-fit state, wherein a friction cone is provided on the first frictional fit ring and is adapted to be rotationally coupled with a frictional fit to a friction cone arranged on the second frictional fit ring, and wherein the actuating ring comprises an external toothing being splined to the second coupling component and an internal toothing being adapted to be coupled to the first coupling component.

20. A shifting device for a motor vehicle, comprising:

a first coupling component which is adapted to be selectively rotationally coupled to a second coupling component with a form-fit, a first frictional fit ring which is non-rotatably coupled to the second coupling component so as to be displaceable along a ring central axis, a second frictional fit ring which is non-rotatably coupled to the first coupling component so as to be displaceable along the ring central axis, a third frictional fit ring which is non-rotatably coupled to the second coupling component so as to be displaceable along the ring central axis, and an actuating ring which is non-rotatably coupled to the second coupling component so as to be displaceable along the ring central axis, the first coupling component being rotationally decoupled from the second coupling component in an open state, the first frictional fit ring and the second frictional fit ring being rotationally coupled with a frictional fit in a frictional fit state, and the actuating ring being rotationally coupled with a form-fit to the first coupling component in a form-fit state, wherein a first spring means is arranged between the first frictional fit ring and the third frictional fit ring and a second spring means is arranged between the third frictional fit ring and the actuating ring, the second spring means being arranged at least in sections radially within the first spring means and the second spring means being arranged at least in sections axially overlapping with the first spring means.

* * * * *